No. 878,672. PATENTED FEB. 11, 1908.
P. H. ROBINSON.
TOOL HOLDER.
APPLICATION FILED DEC. 26, 1906.
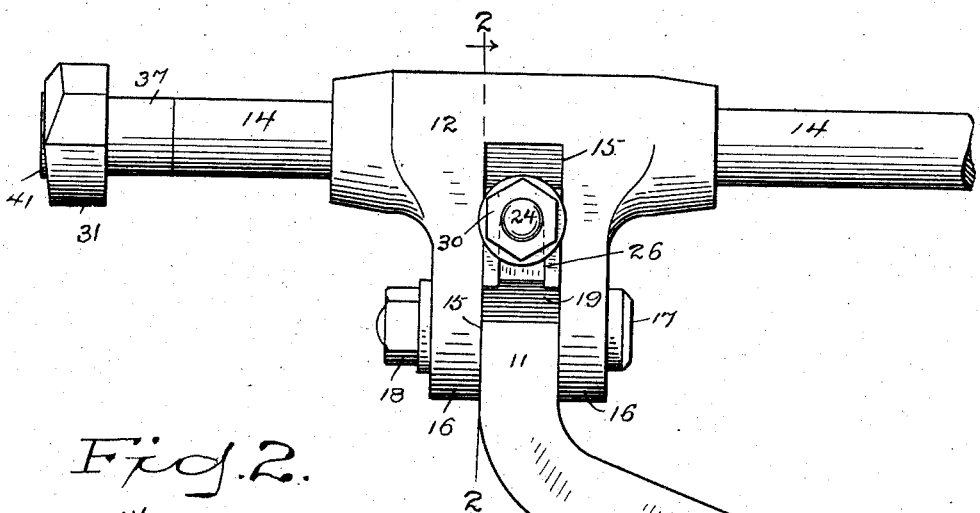
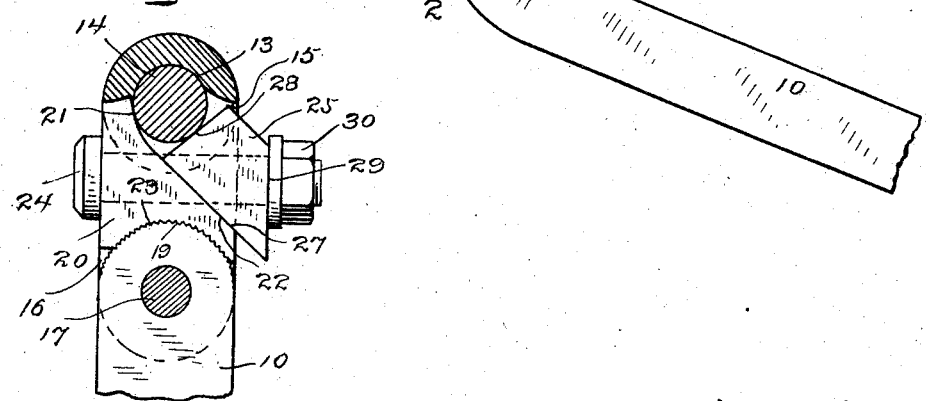
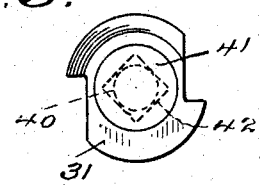
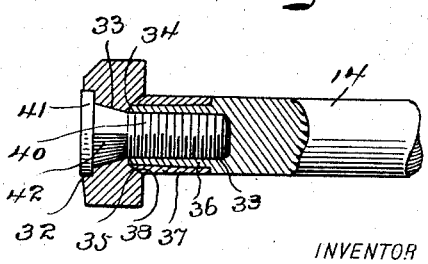
WITNESSES
H. A. Lamb.
S. W. Atherton.
INVENTOR
Pearl H. Robinson
BY
A. M. Wooster
ATTORNEY

UNITED STATES PATENT OFFICE.

PEARL H. ROBINSON, OF SHELTON, CONNECTICUT, ASSIGNOR TO THE O. K. TOOL HOLDER COMPANY, OF SHELTON, CONNECTICUT, A CORPORATION OF NEW YORK.

TOOL-HOLDER.

No. 878,672.     Specification of Letters Patent.     Patented Feb. 11, 1908.

Application filed December 26, 1906. Serial No. 349,546.

*To all whom it may concern:*

Be it known that I, PEARL H. ROBINSON, a citizen of the United States, residing at Shelton, county of Fairfield, State of Connecticut, have invented a new and useful Tool-Holder, of which the following is a specification.

This invention relates to the various classes of tools such as roughing, finishing and threading cutters which are adapted for general use on lathes, boring machines, etc., and has for one object to provide means for attaching the tool to a tool bar by rotation of the tool itself and without a screw driver and for making the tools self-centering on the tool bar.

A further object of the invention is to provide a holder for varying sizes of tool bars that will permit parallel adjustment of the tool bar so that the tool bar can be placed at any height parallel with a hole that is being bored, thereby preventing the tool bar from striking the side of the hole.

A further object of the invention is to provide an adjustable holder for a tool bar that will permit the tool bar to be loosened or removed without changing the adjustment of the holder.

A further object of the invention is to provide a tool holder that will hold a tool bar with perfect rigidity, will permit the bar to be easily removed and in which the strains of use shall be equalized and distributed upon different parts and all lost motion shall be taken up.

With these and other objects in view I have devised the simple and novel tool holder and tool of which the following description in connection with the accompanying drawing is a specification, reference characters being used to indicate the several parts.

Figure 1 is a side elevation of my novel tool holder and tool as in use; Fig. 2 a section on the line 2—2 in Fig. 1, looking toward the right; Fig. 3 an elevation of a cutting tool in place upon a tool bar; and Fig. 4 is a detail sectional view illustrating the attachment of the tool to the tool bar.

10 denotes the shank of my novel tool holder, which is provided with a head 11 shown in the present instance as lying at an angle thereto.

12 denotes a body which is provided with a longitudinal opening 13 adapted to receive loosely a tool bar 14. The body is provided with a slot 15 which receives the head of the shank, and on opposite sides of said slot with ears 16 through which and through head 11 a bolt 17 passes by which the body is adjustably secured to the head by tightening up a nut 18 which clamps ears 16 against the head. The end of the head is made convex and is provided with corrugations 19. Lying in slot 15 between the end of the head and the tool bar is a block 20. This block is provided with a surface 21 which lies in contact with the tool bar, with an incline 22 continuous with surface 21 and with a concave surface 23 having corrugations corresponding with corrugations 19 on the end of the head. The shape of the block is such that the chord of the arc of the concave surface lies at approximately an angle of forty-five degrees to incline 22, the shape of the block in elevation being, roughly speaking, triangular. A bolt 24 passes through the block in a plane at an angle to the incline, the head of the bolt engaging the long outer side of the block.

25 denotes a sliding block which occupies the space in slot 15 between the incline and the tool bar. This block is provided with a slot 26 through which bolt 24 passes loosely, with a surface 27 which engages incline 22, with a surface 28 which engages the tool bar and with an outer surface 29 which is engaged by a nut 30 on bolt 24, whereby the sliding block is forced along incline 22 and the tool bar is clamped between surfaces 21 and 28 and the wall of opening 13 in the body.

31 denotes a tool, in the present instance a cutting tool, which is provided in its outer face with a central countersunk recess 32, leading inward therefrom with a converging angular recess 33, at the end of said recess with a shoulder 34 and in its inner face with an outwardly beveled recess 35. The end of the tool bar is shown as reduced with a slight taper, as at 36, to receive a sleeve 37 of uniform diameter with the tool bar but with an internal taper corresponding with the tapered end of the tool bar. This sleeve is not an essential feature of construction but is preferably used as the wear is upon the sleeve which may be readily removed and replaced so that the tool bar will last for an almost unlimited length of time. The outer end of the sleeve is provided with an incline 38 which corresponds with outwardly beveled recess 35. The end of the tool bar is provided with a threaded hole 39 which receives a locking screw 40. At the outer end of the screw is a head 41 which just passes into recess 32 in the outer face of the tool, and within the head is an angular tapering portion 42 which corresponds with the converging angular recess 33 in the tool.

In attaching the tool in place, the locking screw is passed through the tool, head 41 passing into the recess and the angular tapering portion engaging the converging angular recess. As the screw cannot rotate independently of the tool, it follows that rotation of the tool will turn the screw to place and lock the tool, which may be set to place with a spanner although this is unnecessary as strain upon the tool in use tends to tighten the screw in the end of the tool bar. As the screw is turned to place, the tool will be centered on the tool bar by the engagement of incline 38 at the end of the bar, in the present instance at the end of the sleeve specifically, with outwardly beveled recess 35 in the inner face of the tool.

The tool bar is locked in the body by tightening nut 30 on bolt 24. In order to give to the tool bar and tool the required parallel adjustment, nuts 18 and 30 are both loosened and the body oscillated on bolt 17 to place the body, and with it the tool bar and tool, at the required adjustment. Nut 18 is then tightened up to lock the body in place by clamping ears 16 against the head, after which nut 30 is tightened up. The functions of nut 30 are to both lock the tool holder in the body and also to lock the body rigidly to head 11. When this nut is tightened up it forces sliding block 25 forward and forces surface 28 of said sliding block against the tool bar, thereby clamping the tool bar between said surface and surface 21 on block 20 and the wall of opening 13 in the body. Surface 27 of the sliding block is also forced against incline 22 of block 20 which forces the corrugated concave surface 23 of said block into engagement with corrugations 19 on head 11, thereby rigidly locking the body to the head. This lock of the tool bar to the body and of the body to the head by means of the sliding block takes up all lost motion, provides for variation in the size of tool bars and also equalizes the strain upon the parts. The tool may be removed from the tool bar without removing the latter from the body or loosening it. Should it be required to adjust or remove the tool bar without changing the adjustment of the body on the head, this may be accomplished by loosening nut 30 which leaves the tool bar loose in the body, the body however still remaining locked to the head by means of bolt 17 and nut 18.

Having thus described my invention I claim:

1. The combination with a tool bar and a convex head, of a body through which the tool bar passes and which is provided with a slot to receive the head, a bolt passing through the body and the head, a block in said slot which engages the tool bar and is provided with an incline and a concave surface to engage the head, a sliding block and means for forcing said sliding block against the tool bar and the incline whereby the tool bar is locked in the body and the body is locked to the head.

2. The combination with a tool bar and a convex head having corrugations 19, of a body through which the tool bar passes and which is provided with a slot to receive the head, a bolt passing through the body and the head, a block in said slot which engages the tool bar and is provided with an incline and a corrugated concave surface to engage the head, a sliding block and means for forcing said sliding block against the tool bar and the incline, substantially as described, for the purposes specified.

3. A tool holder comprising a body having an opening to receive a tool bar and a slot, a convex head in said slot, a triangular block in said slot having a concave surface which receives the head and an incline, a slotted sliding block also in said slot, a bolt passing through the body and the head, a bolt passing through the block and through the slot in the sliding block and a nut engaging said bolt and the sliding block whereby the sliding block is forced against the incline on the block and the latter is forced against the head.

4. A tool holder comprising a body having a slot, a convex head having corrugations, a bolt for securing the body to the head, a block in said slot having a corrugated concave surface to engage the head and an incline, a sliding block engaging the incline and means for forcing the sliding block against the incline and the block against the head, substantially as described, for the purposes specified.

5. A tool holder comprising a body having an opening to receive a tool bar and a slot, a head, means for loosely securing the body to the head, a block in said slot engaging the head, a sliding block engaging the block and means for forcing the sliding block forward, substantially as described, for the purposes specified.

In testimony whereof I affix my signature, in presence of two witnesses.

PEARL H. ROBINSON.

Witnesses:
   EDW. W. KNEEN,
   CARRIE L. BAIER.